United States Patent
Tarr et al.

[11] Patent Number: 5,329,908
[45] Date of Patent: Jul. 19, 1994

[54] COMPRESSED NATURAL GAS INJECTION SYSTEM FOR GASEOUS FUELED ENGINES

[75] Inventors: Yul J. Tarr; Julius P. Perr, both of Columbus, Ind.

[73] Assignee: Cummins Engine Company, Inc., Columbus, Ind.

[21] Appl. No.: 73,062

[22] Filed: Jun. 8, 1993

[51] Int. Cl.$^5$ .................. F02B 43/00; F02M 51/00
[52] U.S. Cl. ........................... 123/527; 123/472
[58] Field of Search ............ 123/27 GE, 525, 527, 123/472, 305, 494

[56] References Cited

U.S. PATENT DOCUMENTS

| | | | |
|---|---|---|---|
| 3,982,516 | 9/1976 | Abernathy | 123/27 GE |
| 4,235,205 | 11/1980 | Fukui et al. | 123/478 |
| 4,430,978 | 2/1984 | Lewis et al. | |
| 4,505,249 | 3/1985 | Young | |
| 4,537,172 | 8/1985 | Kanehara et al. | 123/494 |
| 4,617,904 | 10/1986 | Pagdin | |
| 4,632,083 | 12/1986 | Reggiani | |
| 4,774,909 | 10/1988 | Dolderer | |
| 4,779,596 | 10/1988 | Babitzka et al. | 123/472 |
| 4,846,126 | 7/1989 | Stannard | 123/27 GE |
| 5,067,467 | 11/1991 | Hill et al. | 123/525 |
| 5,076,244 | 12/1991 | Donaldson | 123/527 |
| 5,136,986 | 8/1992 | Jensen | 123/27 GE |
| 5,150,685 | 9/1992 | Porter et al. | 123/527 |
| 5,201,299 | 4/1993 | Kong | 123/472 |

FOREIGN PATENT DOCUMENTS 108855 6/1984 Japan .................. 123/525

*Primary Examiner*—E. Rollins Cross
*Assistant Examiner*—Thomas N. Moulis
*Attorney, Agent, or Firm*—Sixbey, Friedman, Leedom & Ferguson

[57] ABSTRACT

In accordance with preferred embodiments, a fuel injector has a gas accumulator of a volume that is at least ten times the maximum amount of fuel which would have to be injectable thereby, and a solenoid operated poppet valve with an end face that opens into the combustion cylinder and is shaped to deflect a portion of the fuel injected into direct contact with the ignition plug. In a first embodiment, using a variable fuel supply, an electronic control unit (ECU) controls the injection timing to inject the compressed gas into the cylinders as each's piston nears its top dead center (TDC) position to obtain diesel engine-like efficiencies ($\eta = 45\%$) so long as the compressed gas supply pressure is sufficiently high (at least approximately 2,000 psi), and when the compressed gas supply pressure becomes too low for high efficiency operation (i.e., below 2,000 psi), the ECU changes the manner of operation so that fuel is injected into the engine when piston is near its bottom dead center position (BDC) so that it can be premixed with air prior to ignition to produce gasoline engine-like efficiencies ($\eta = 35\%$).

27 Claims, 3 Drawing Sheets

COMPRESSED NATURAL GAS INJECTION SYSTEM FOR GASEOUS FUELED ENGINES

BACKGROUND OF THE INVENTION

1. Field of the Invention

The present invention relates to fuel injection systems for gaseous fuel engines. In particular, the invention relates to a system by which a compressed natural gas fueled engine can obtain efficiencies at or above those obtained by diesel engines.

2. Description of Related Art

Jensen U.S. Pat. No. 4,865,001 discloses a gaseous fuel injector valve, having a tubular body and stemmed poppet valve, for injection of a mixture of a gaseous and a liquid fuel into a diesel engine. The poppet valve includes a coil compression spring which normally urges the valve stem into a closed position sealing a fuel flow passage into the combustion chamber and has an outwardly opening valve face portion over which the outflowing supply of fuel passes. The injector valve is electronically controlled by a solenoid valve to cause gaseous fuel to be admitted into engine cylinder during the part of the compression stroke after the exhaust valve has closed and prior to rapid increase in the compression pressure that follows. However, this injector is not designed for use in engines that operate solely with gaseous fuels, nor does it deal with the problems associated with engines that are operated solely using gaseous fuels, and particularly, the need to obtained increased efficiency or the difficulties of igniting a gaseous fuel (the liquid fuel serves as a pilot for ignition of the gaseous fuel, being injected after the gaseous fuel).

In U.S. Pat. No. 4,505,249 of Young, a fuel control system for gaseous fueled engines is disclosed wherein a pressure regulator is provided for maintaining a constant pressure from the fuel source. However, Young's system is a carburetion system and is primarily directed to using the gaseous fuel in supplementing the fuel supply of a diesel engine. Thus, the Young patent, also does not deal with the problem increasing the efficiency of an engine fueled solely with compressed gas; carburetor-type compressed gas systems, which work like a conventional gasoline engine, have a lower efficiency than a diesel engine.

Lewis et al. disclose in U.S. Pat. No. 4,430,978, a system for the direct injection of liquid petroleum gas in to an engine. The Lewis et al. system compensates for the effect of variations in fuel pressure and density on the fuel metering accuracy by measuring the pressure differential across the fuel injector and varying the duty cycle (pulse width) of the injector to compensate for supply pressure variations. Furthermore, since the Lewis et al. system injects liquid gas, compensation must be provided for the vaporization of liquid gas fuel in the system upstream of the injector and in the injector itself.

Of course, numerous systems are known by which an engine may be operated solely with compressed gas as a fuel; see, for example, Dolderer U.S. Pat. No. 4,774,909, Reggiani U.S. Pat. No. 4,632,083, and Pagdin U.S. Pat. No. 4,617,904. Dolderer recognizes the problem that gas engines have been unable to match the efficiency of diesel engines and the difficulties that have been encountered in trying to do so, and like the Lewis et al. system, Dolderer injects gas fuel in a liquid state. No prior art device has successfully addressed the problems associated with the injection of gaseous fuels, into an engine, in a gaseous state and as the only fuel, so as to achieve efficiencies at or above those attainable by a conventional diesel engine.

SUMMARY OF THE INVENTION

In view of the foregoing, it is a primary object of the present invention to provide a high pressure, compressed natural gas injection system for internal combustion engines which will achieve efficiencies at or above those attainable by a conventional diesel engines.

It is a further object of the present invention to obtain the preceding object with existing engines without requiring significant modifications thereto.

It is another object of the present invention to provide a compressed natural gas fuel injector which will be able to provide an adequate supply of fuel to an engine at a pressure which will remain stable during the period of injection.

A still further object of the invention is to achieve the initially-stated object with both variable fuel pressure supplies and constant pressure fuel supplies.

Yet another object of the present invention is to provide a fuel supply unit which will be able to provide a constant pressure supply of a compressed gas fuel in gaseous form.

The above objects and others are obtained in accordance with preferred embodiments of the invention by utilizing a fuel injector which has a gas accumulator that has a volume that is at least ten times the maximum amount of fuel which would have to be injectable thereby, and which has a solenoid operated poppet valve with an end face that opens into the combustion cylinder and is shaped to deflect a portion of the fuel injected into direct contact with the ignition plug. In a first embodiment, using a variable pressure fuel supply, an electronic control unit (ECU) acts to control the injection timing to obtain diesel engine-like efficiencies ($\eta = 45\%$) so long as the compressed gas supply pressure is sufficiently high (at least approximately 2,000 psi), and then, when the compressed gas supply pressure becomes too low for high efficiency operation (i.e., below 2,000 psi), the ECU changes the manner in which fuel is injected into the engine, allowing it to operate, despite the lower compressed gas supply pressures, at gasoline engine-like efficiencies ($\eta = 35\%$). In particular, as long as pressure of the compressed gas supply is determined to be at least approximately 2,000 psi, the ECU will cause the injectors to inject the compressed gas into the cylinders when each's piston is near its top dead center (TDC) position; however, when the fuel supply pressure drops too low, the ECU causes the fuel to be injected when the intake valve is open and the piston is approaching its bottom dead center position (BDC), so that it can be premixed with air prior to ignition.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
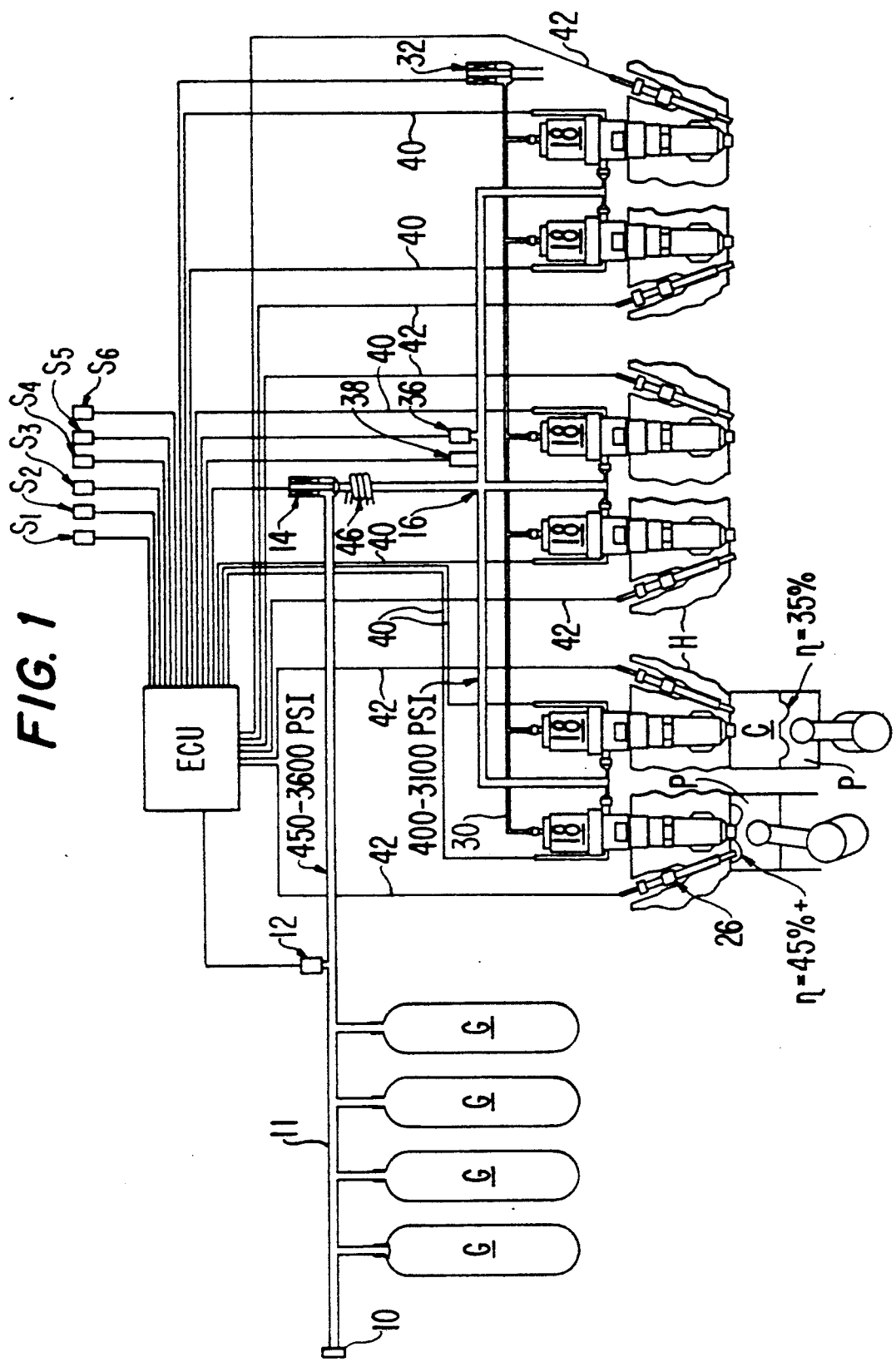
FIG. 1 is a schematic depiction of a compressed natural gas fuel injection system in accordance with a first embodiment of the present invention which uses a variable pressure gas supply.

In FIG. 1, a first embodiment of a compressed natural gas fuel injection system in accordance with the present invention which uses a supply of compressed natural gas that is not maintained at a constant pressure. A supply of compressed natural gas is contained in a plurality of gas tanks G which can be refilled via a gas filling connector 10. Pressure in the gas line leading from the gas tanks will vary from around 3600 psi when the tanks are fully charged and decreases to about 450 psi as the fuel supply is depleted. The actual pressure in the supply line 11 is measured by a gas supply pressure sensor 12. A normally open shutoff and pressure regulator valve 14 closes the supply line 11 when the engine is inoperative, and also serves as a pressure regulator by which the gas pressure can be reduced under certain circumstances which will be described in greater detail below.

Figure 2:
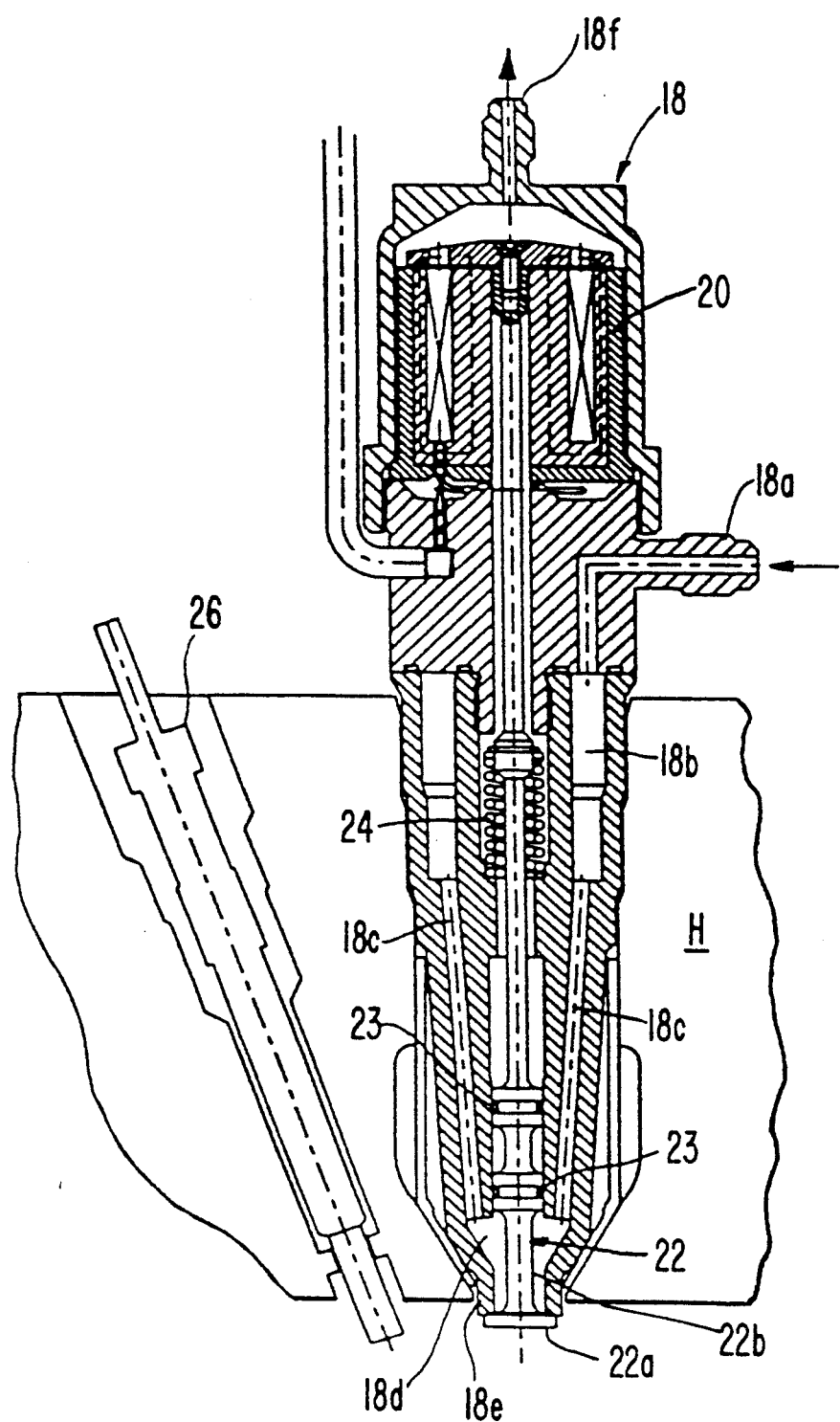
FIG. 2 shows a fuel injector for use in the compressed natural gas fuel injection systems of the present invention.

Downstream of the shutoff and pressure regulator valve 14, a common distribution rail 16 connects the supply pressure sensor 12 with a plurality of fuel injectors 18 (six in the example shown). As shown in FIG. 2, the fuel injectors 18 have a solenoid 20 for opening a poppet valve 22, and a return spring 24 by which the poppet valve 22 is normally held in its closed position. A pair of polytetraflouroethylene rings are mounted on the stem 22a to both seal against gas leakage along the valve stem 22a and provide low friction guidance of the reciprocating movement of the poppet valve. In this regard, it is noted that the maximum valve lift (movement of the end face 22b of the poppet valve in an opening direction) is only about 0.2–0.3 mm.

Gaseous fuel from rail 16 enters the injector 18 via an intake port 18a and flows into an accumulator portion 18b the volume of which is at least ten times as large as that of the largest charge which would be injected into the engine cylinder C (FIG. 1), so that the gas pressure will remain stable during injection. Passages 18c connect the accumulator 18b a discharge chamber 18d, from which the fuel is discharge upon opening of the poppet valve 22. Because the nozzle 18e of the injector 18 projects a short distance into the cylinder, and since the end face 22b of the poppet valve 22 conically merges into the stem 22a of the poppet valve at its inner side, the gas being discharged will spread out as a layer with a portion thereof being directed into the area of glow/spark plug 26 (which is a general utility ignition plug that is capable of function as both a glow plug and as a spark plug). As a result, ignition of the gaseous fuel can be produced in the area of the plug 26 (even when it is operated as a glow plug) and ignition of the fuel will spread across from the plug 26 across the chamber; this ignition result can be obtained without requiring any particular orientation of the injector 18.

Any gas which might leak past the rings 23, upwardly along the poppet valve 22, will be discharged from the injector 18 into a vent line 30 which is connected to a safety 18f at the top of each injector 18. During operation of the engine, a vent solenoid shut-off valve 32 will be open, allowing the leakage gas to be vented to a vent line 34, which leads to the air intake manifold of the engine (not shown). However, shut-off valve 32 closes when the engine is turned off in order to prevent a potentially dangerous accumulation of gas in the intake manifold.

The quantity of fuel injected is a function of the pressure of the gas and the time that the injector poppet valve 22 is open. To insure that the proper quantity of gas will be injected for the particular set of operating conditions existing at any point in time, an electronic control unit (ECU) is provided. The ECU receives indications of the supply pressure in supply line 11 from the supply pressure sensor 12, and the injection pressure and temperature of the gas in the distribution rail 16 from an injection pressure sensor 36 and a gas temperature sensor 38. Additionally, a series of sensors $S_1$–$S_6$ provide inputs to the ECU with respect to such engine parameters as accelerator pedal position, engine speed, coolant temperature, manifold pressure, altitude, and intake air temperature. Based on the inputs from the various sensors, $S_1$–$S_6$, the ECU, in a manner which is conventional, determines the appropriate quantity of fuel to be injected as well as the time that the injector's poppet valve must be open to inject the calculated quantity of fuel, and then sequentially sends the appropriate signal to the solenoid 20 of each the injectors 18 via control lines 40. Likewise, at the appropriate times, signals are sent to the glow/spark plugs 26 via control lines 42.

The ECU also controls the injection timing, in a way that is novel to the present invention, so as to enable the engine to obtain diesel engine-like efficiencies ($\eta = 45\%$) so long as the compressed gas supply pressure is sufficiently high (at least approximately 2,000 psi). When the compressed gas supply pressure becomes too low for high efficiency operation (i.e., below 2,000 psi), the ECU changes the manner in which fuel is injected into the engine, allowing it to operate despite the lower compressed gas supply pressures, at gasoline engine-like efficiencies ($\eta = 35\%$). In particular, as long as pressure of the compressed gas supply is determined to be at least approximately 2,000 psi, the ECU will cause the injectors 18 to inject the compressed gas into the cylinders C when each's piston P is near its top dead center (TDC) position (see, the leftmost cylinder in FIG. 1), i.e., from about 20° before to about 10° after TDC depending on fuel economy and emissions requirements. In this mode of operation, the general utility spark/glow ignition plugs 26 are operated as glow plugs for purposes of igniting the injected fuel, and ignition is facilitated, as noted above, by the design of the valve end face 22a, which insures that some of the injected gas will directly contact the spark/glow plugs 26. Thus, about the first 25% of the fuel can be burned with diesel engine-like efficiency when the system is fully charged.

However, since it cannot be expected that the system will be recharged with compressed gas when it is still three quarters full, and since insufficient fuel would be injected to adequately power the engine, if the fuel at pressures below 2,000 psi is not injected until the piston P nears its TDC position, once it is determined that the compressed gas supply pressure has dropped below approximately 2,000 psi, the ECU changes over to a gasoline engine mode of operation. In the gasoline engine mode, the compressed gas is caused to be injected into each engine cylinder C during the portion of the engine cycle when the unillustrated, conventional, engine air intake valve is open (in the first of the two piston strokes per cycle) and piston P is moving toward its bottom dead center position. (BDC), gas injection commencing in time to insure that injection of the prescribed quantity of fuel is completed before the piston passes BDC. The injected gas is, thus, premixed with the requisite amount of air, which is admitted into the cylinder C under the control of the ECU, and the fuel-air mixture is ignited by a spark from the plug 26 (operating in a spark plug mode) when the piston nears its TDC position.

Furthermore, since the injection valves 22 have a relatively slow response rate, at high gas supply pressure levels, it can be difficult to precisely meter small quantities of fuel into the engine cylinders C. Thus, when the ECU determines that a sufficiently small quantity of fuel cannot be metered into the engine cylinders, given the existing gas supply pressure and the minimum response time of the injector valve 22, shutoff and pressure regulator 14 is caused to partially close so as to produce a drop in the pressure of the compressed gas (down to, for example, 1500 psi) as it passes from the supply line 11 into the distribution rail 16. To prevent freezing of the distribution rail 16 due to cooling of the compressed gas as a result of the pressure drop produced, a heater 46 serves to warm the distribution rail 16 just downstream of the shutoff and pressure regulator valve 14, where the gas expands within the distribution rail.

As can be appreciated from the foregoing, the FIG. 1 embodiment provides a relatively simple means for increasing the efficiency of an engine that operates on compressed nature gas; but, only 25% of the gas supply can be burned with diesel engine-like efficiency and this shortcoming it traceable to the drop-off in the supply pressure of the compressed natural gas as it is consumed (i.e., the system volume remains constant and as the diminishing quantity of gas expands to fill the system volume, its pressure drops). This deficiency is eliminated in the injection system of FIG. 3, by replacing the variable pressure supply unit of the FIG. 1 system with the constant pressure supply unit shown in FIG. 3. Since only the gas supply unit of the FIG. 3 system differs from that described above, the following description will be limited to the gas supply structure shown to the left of the ECU and engine cylinder head H in FIG. 3, the structure to the right bearing the same reference numerals as used in FIG. 1, so that reference can be made to the description thereof above for an explanation of these elements, with the exception that the engine always operates in the described higher efficiency, diesel engine-type mode in which the ECU always causes the gaseous fuel to be injected as each piston P nears its TDC position, so that the a conventional glow plug can be used instead of a general utility, glow/spark, ignition plug.

The constant pressure supply unit 50 is comprised of a hydraulic pump 52, a main gas supply 54, a rotary switch valve 56 interconnecting the main gas supply 54 with the hydraulic pump 52 (the switch valve 56 being shown in longitudinal cross section in association with pump 52 and in transverse cross section in association with the main gas supply 54), and an auxiliary gas tank 58. The main gas supply comprises a plurality of gas/liquid tanks T (four tanks $T_1$-$T_4$ being shown by way of example only). Each of the tanks $T_1$-$T_4$ is divided into a gas side and a liquid side by a diaphragm D. As illustrated, the leftmost tank $T_1$ is completely filled with a liquid, for example, hydraulic fluid (the diaphragm D being displaced fully upward against gas inlet of the tank), and the other tanks being completely filled with gas phase compressed gas (the diaphragm D in each of these tanks being fully depressed against the liquid phase inlet of the tank). Use of a diaphragm prevents mixing of the gas and liquid, especially if absorption of the liquid is a potential problem, and the diaphragm also prevents discharging of the liquid into the supply line 11.

Prior to the initial filling of the main gas supply 54 with gaseous fuel, the hydraulic pump 52 fills tank $T_1$ with liquid. One tank volume of liquid is maintained in the gas supply unit at all times thereafter; although, this volume is moved from tank to tank is will be described. After the tank $T_1$ is filled, the remaining tanks $T_2$-$T_4$ and the auxiliary tank 58 are filled with compressed natural gas via gas filling connector 10, shutoff and pressure regulator valve 14 being closed for this purpose. A check valve 60 prevents the gas from escaping from the gas supply unit 50 via connector 10, and the check valves 62 prevent gas from flowing back from a gas-containing tank to an already discharged tank.

Figure 3:
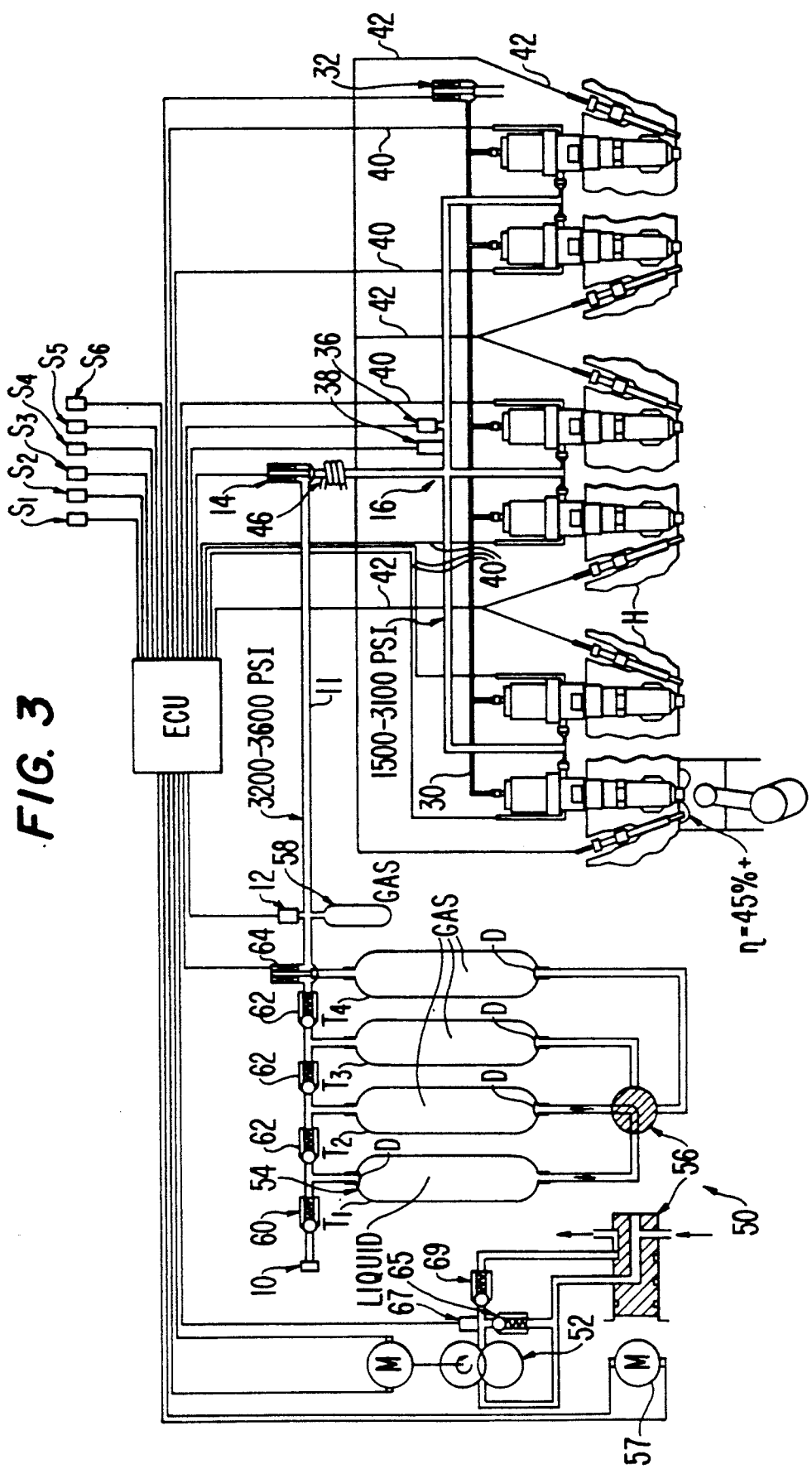
FIG. 3 is a schematic depiction of a compressed natural gas fuel injection system in accordance with a second embodiment of the present invention which uses a constant pressure gas supply.

The hydraulic pump acts to maintain a high pressure in the gas tanks by pressurizing the gas-containing tanks with liquid that is pumped into them from the liquid-containing tank. That is, as is represented in FIG. 3, the switch valve 56 connects the intake of pump 52 with the liquid-containing tank and the outlet of the pump 52 with one of the gas-containing tanks; in this case, liquid is being pumped from tank $T_1$ into tank $T_2$ to pressurize the gas therein. To minimize energy consumption, the ECU turns on the pump 52 only when either the gas pressure, as monitored by sensor 12, is below 3,200 psi or when the engine is motoring, i.e., coasting or going downhill, if the pressure detected is between 3,200–3,600 psi, so that pump utilizes waste energy to pressurize the system whenever possible.

When the gas has been discharged from one tank, in which event that tank is now filled with liquid, the ECU causes the switch valve 56 to be automatically rotated one position by motor 57, so that the intake of pump 52 will, then, be connected with the new liquid-containing tank and the outlet of the pump 52 will be connected with the next one of the gas-containing tanks; in this case, liquid would be pumped from tank $T_2$ into tank $T_3$ to pressurize the gas therein. This process would be performed until the supply of compressed gas is depleted from all of the tanks or recharging of the system with compressed gas is performed. In the illustrated embodiment, with the supply of gas fully exhausted, tank $T_4$ would be full of the liquid and tanks $T_1$ to $T_3$ would merely contain residual quantities of gas that would expand to fill the space with these tanks. After filling of the tanks $T_1$ to $T_3$ with gas, the liquid in the tank $T_4$ is pumped back to the first tank, T1, to pressurize the gas therein, during which time isolator valve 64 will be closed to insure that the gas is supplied from tanks $T_1$ to $T_3$ to the downstream portion of supply line 11 instead of being drawn back into tank $T_4$. Isolator valve 64 remains closed, as the liquid is pumped from tank to tank, until the next time that the tanks are to be filled. Alternatively, prior to refilling of the main gas supply 54, the liquid can be pumped back to tank $T_1$, and only after the liquid has been fully returned to the first tank, are the other tanks being recharged with compressed gas fuel, and the process of pumping the liquid from tanks $T_1$ to $T_2$ to $T_3$ to $T_4$ repeated during engine operation.

However, if the refueling process is stopped before the gas-containing tanks have been fully refilled and the engine operated before the liquid has been able to fully repressurize the system, the absence of adequate supply pressure (at least 2,000 psi) will be detected by sensor 12 and the ECU will cause the auxiliary tank to discharge compressed gas into supply line 11 in order to provide an adequate supply pressure until the hydraulic pump is able to bring the main gas supply 54 up to the required pressure level (although some drop-off in power may be experienced, nonetheless, when auxiliary tank operation becomes necessary). The same is true when the last tank is reached if refilling is performed with the liquid split between two of the tanks: For example, if the main gas supply 54 is only partially refilled so that the pressure any of the tanks $T_1$ to $T_4$ is half the normal fully-filled pressure of 3,600 psi, the liquid will have to pumped further into the gas-containing tank before the gas will be pressurized sufficiently, because the pressure of the gas in any partially filled tank will be proportionally less than the maximum pressure (a half-filled tank would be at only 1800 psi). Likewise, when the liquid is split between two of the tanks at the time of refilling, even if the pressure in the tank that had a remaining portion of the liquid is fully refilled, its pressure will drop when the liquid in it is pumped out, so that when it is reached for pumping out of its gas contents, it will have to be additionally pressurized to make up for that pressure drop, and during the time that it is being pressurized, the auxiliary tank may be triggered.

The auxiliary tank 58 will, also, be triggered when the main gas supply 54 is about to be exhausted; however, the auxiliary tank 58 does not contain enough gas to run the engine for any appreciable period of time should the main supply tanks $T_1$ to $T_4$ be depleted. Advantageously, a signal will be generated whenever gas is being tapped from the auxiliary tank so that the user will become aware that system pressure is low, if it was just refilled, or refueling is required immediately, if it has not been filled for some time.

To prevent overpressurization of the system, a pressure relief valve 65 is provided on the pump 52 which opens a bypass to the suction side of the pump when the pressure at the pressure side exceeds, e.g., 4,000 psi, and actuation of the pump 52 is prevented as long as such an excessive pressure is detected by a pressure switch 67. Additionally, a check valve 69 prevents leakage from the main gas supply 54 when the hydraulic pump 52 is not running. It should also be appreciated that a mechanically driven switchable type pump could be used instead of an electrically driven hydraulic pump.

While we have shown and described various embodiments in accordance with the present invention, it is to be understood that the invention is not limited thereto, but is susceptible of numerous changes and modifications as known to those skilled in the art. For example, other injectors other than that shown in FIG. 2 may be utilized, and the number of fuel tanks in the main gas supply may be varied to more or less than four. Furthermore, while use in conjunction with a six cylinder engine has been shown, the invention is not limited to use with engines having any particular number of cylinders. Therefore, we do not wish to be limited to the details shown and described herein, but intend to cover all such changes and modifications as are encompassed by the scope of the appended claims.

INDUSTRIAL APPLICABILITY

The present invention will have a wide range of applicability with respect to internal combustion engines, both motor vehicular and stationary, where it is design to obtain the benefits associated with the combustion of compressed natural gas instead of fossil fuels such as oil and gasoline, without loss of combustion efficiency. Because of the high efficiencies achievable according to the invention, it will find use in environments in which diesel-fueled engines were previously preferred.

We claim:

1. Compressed gas injection system for gaseous fueled engines, comprising a gas supply containing a compressed fuel gas in a gaseous state, at least one fuel injector for injecting a variable quantity of gaseous fuel into an engine cylinder, a supply line means for enabling the compressed fuel gas to flow said supply of compressed fuel gas to said at least one fuel injector, said fuel gas being at a pressure above at least approximately 2,000 psi for at least a portion of the total contents of the gas supply, and an electronic control means for controlling both the quantity fuel gas injected into the engine cylinder by said fuel injector and the time at which it is injected relative to a cycle of operation of the engine cylinder as a function of monitored gas pressure and engine operating parameters, said time being from between about 20° before to about 10° after said piston reaches a top dead center position whenever said fuel gas pressure is above at least approximately 2,000 psi.

2. Compressed gas injection system according to claim 1, wherein said gas supply contains gas at a supply pressure which varies as a function of the quantity of fuel gas remaining therein, the fuel gas in said gas supply having a supply pressure substantially in excess of 2,000 psi when said gas supply is completely filled and having a pressure which decreases below 2,000 psi while said gas supply is still substantially filled; wherein said electronic control means, in response to detection of a gas supply pressure below 2,000 psi changes the time at which the fuel gas is injected, relative to the cycle of operation of the engine cylinder, to a portion of the cycle when an engine air intake valve is open and the piston is moving toward a bottom dead center position which will allow the injection of the fuel gas to be completed before the piston passes said bottom dead center position.

3. Compressed gas injection system according to claim 2, wherein said fuel injector has a gas accumulator, the volume of said accumulator being at least ten times a maximum amount of fuel to be injectable thereby, and which has a solenoid operated poppet valve with an end face that opens outwardly away from a nozzle end thereof, said end face being shaped to radially deflect a portion of the fuel injected into direct contact with an ignition plug of the engine.

4. Compressed gas injection system according to claim 3, wherein a flow regulator valve is provided in said supply line means, said regulator valve having a normally open position when the injection system is supplying fuel to the engine and a partially closed position which produces a drop in said supply pressure; and wherein said electronic control means is operative to cause said regulator valve to move into its partially closed position in response to a determination that the supply pressure is too high for the injector to be able to meter a quantity of fuel that is as small as the quantity determined to be required on the basis of the monitored engine operating parameters due to a maximum response rate of the poppet valve.

5. Compressed gas injection system according to claim 4, wherein the supply pressure substantially in excess of 2,000 psi when said gas supply is completely filled is approximately 3,600 psi.

6. Compressed gas injection system according to claim 5, wherein a heating means is provided for preventing freezing of the fuel gas at a downstream side of said regulator valve.

7. Compressed gas injection system according to claim 3, wherein the supply pressure substantially in excess of 2,000 psi when said gas supply is completely filled is approximately 3,600 psi.

8. Compressed gas injection system according to claim 2, wherein the supply pressure substantially in excess of 2,000 psi when said gas supply is completely filled is approximately 3,600 psi.

9. Compressed gas injection system according to claim 1, wherein said fuel injector has a gas accumulator, the volume of said accumulator being at least ten times a maximum amount of fuel to be injectable thereby, and which has a solenoid operated poppet valve with an end face that opens outwardly away from a nozzle end thereof, said end face being shaped to radially deflect a portion of the fuel injected into direct contact with an ignition plug of the engine.

10. Compressed gas injection system according to claim 1, wherein said gas supply comprises a main gas supply and means for pressurizing the compressed fuel gas contained therein for maintaining a substantially constant gas supply pressure in the main gas supply despite depletion of the fuel gas therefrom; and wherein said time at which the fuel gas is injected by the fuel injector, relative to the cycle of operation of the piston in the engine cylinder, is between about 20° before to about 10° after said piston reaches a top dead center position under all operating conditions.

11. Compressed gas injection system according to claim 10, further comprising a pump and a switch valve; wherein said main gas supply comprises a tank unit having plurality of gas tanks of equal volume and a quantity of liquid equal to the volume of each gas tank, each of said tanks having a diaphragm which separates its interior into a gas side in which said compressed fuel gas is contained and a liquid side in which said quantity of liquid is received; wherein the gas side of each gas tank communicates with said gas supply line means; wherein said switch valve connects a liquid-containing one of said gas tanks with a suction side of said pump and connects a gas-containing one of said gas tanks with a pressure side of said pump for pressurizing the gas in the gas-containing tank with liquid pumped from the liquid-containing tank, until said gas-containing tank is emptied of gas and becomes the liquid-containing tank; and wherein motive means is provide for changing the connections produced by the switch valve when the gas-containing tank becomes the liquid-containing tank, so that said quantity of liquid is moved from tank to tank as the gas contents of the main gas supply is depleted.

12. Compressed gas injection system according to claim 11, wherein said fuel injector has a gas accumulator, the volume of said accumulator being at least ten times a maximum amount of fuel to be injectable thereby, and has a solenoid operated poppet valve with an end face that opens outwardly away from a nozzle end thereof, said end face being shaped to radially deflect a portion of the fuel injected into direct contact with an ignition plug of the engine.

13. Compressed gas injection system according to claim 12, wherein a flow regulator valve is provided in said supply line means, said regulator valve having a normally open position when the injection system is supplying fuel to the engine and a partially closed position which produces a drop in said supply pressure; and wherein said electronic control means is operative to cause said regulator valve to move into its partially closed position in response to a determination that the supply pressure is too high for the injector to be able to meter a quantity of fuel that is as small as the quantity determined to be required on the basis of the monitored engine operating parameter due to a maximum response rate of the poppet valve.

14. Compressed gas injection system according to claim 13, wherein the substantially constant supply pressure is approximately 3,200–3,600 psi.

15. Compressed gas injection system according to claim 14, wherein a heating means is provided for preventing freezing of the fuel gas at a downstream side of said regulator valve.

16. Compressed gas injection system according to claim 12, wherein the substantially constant supply pressure is approximately 3,200–3,600 psi.

17. Compressed gas injection system according to claim 11, wherein the substantially constant supply pressure is approximately 3,200–3,600 psi.

18. Compressed gas injection system according to claim 10, wherein said fuel injector has a gas accumulator, the volume of said accumulator being at least ten times a maximum amount of fuel to be injectable thereby, and which has a solenoid operated poppet valve with an end face that opens outwardly away from a nozzle end thereof, said end face being shaped to radially deflect a portion of the fuel injected into direct contact with an ignition plug of the engine.

19. Compressed gas injection system according to claim 11, wherein said switch valve is a rotary a switch valve.

20. Compressed gas injection system according to claim 11, further comprising an auxiliary gas supply and pressure sensing means for detecting the pressure in the gas supply line means; and wherein said electronic control means is operative for causing compressed gas in said auxiliary gas supply to be released into the gas supply line means in response to detection of a pressure of the compressed gas therein that is below a predetermined pressure and for causing the release of compressed gas by said auxiliary gas supply to be terminated when the pressure in the gas supply line means is brought back above said predetermined pressure.

21. Compressed gas injection system according to claim 20, wherein said predetermined pressure is at least 2,000 psi.

22. Compressed gas injection system according to claim 11, wherein said plurality of gas tanks are connected to said gas supply line means in series, a check valve being located upstream of each of said tanks and a downstream-most one of said gas tanks being provided with an isolator valve for isolating said downstream-most one of said gas tanks from the gas supply line when it is said liquid-containing tank and the liquid is being pumped back to an upstream one of said gas tanks.

23. Compressed gas injection system according to claim 22, wherein said liquid in the tank unit is a hydraulic fluid.

24. Compressed gas injection system according to claim 11, wherein said liquid in the tank unit is a hydraulic fluid and said pump is a hydraulic pump.

25. Compressed gas injection system according to claim 11, wherein said electronic control means is operative for causing the pump to pump said liquid whenever the engine is motoring and the pressure in the main gas supply is in a predetermined pressure range so as to utilize waste energy for pressurizing the gas fuel; and wherein said electronic control means is operative for causing the pump to pump said liquid whenever the pressure in the main gas supply is below said predetermined pressure range.

26. Compressed gas injection system according to claim 25, wherein said predetermined pressure range is 3,100 to 3,600 psi.

27. Compressed gas injection system according to claim 25, further comprising safety means for preventing overpressurization of the main gas supply, said safety means including a pressure relief valve for discharging liquid from the pressure side of the pump when a preset limiting pressure is detected, and a pressure switch for preventing the electronic control means from causing the pump to pump said liquid, even though the engine is motoring, when a pressure above said predetermined pressure range is detected.

* * * * *